United States Patent [19]

Lodaya et al.

[11] Patent Number: 5,403,487

[45] Date of Patent: Apr. 4, 1995

[54] PROCESS FOR BIOCHEMICAL OXIDATION OF ULTRA-TOXIC WASTEWATER IN A PACKED BED BIOREACTOR

[75] Inventors: Mayur P. Lodaya, Fremont; Mehmet A. Gencer, Brecksville, both of Ohio

[73] Assignee: The B. F. Goodrich Company, Akron, Ohio

[21] Appl. No.: 994,846

[22] Filed: Dec. 22, 1992

[51] Int. Cl.$^6$ ............................................. C02F 3/08
[52] U.S. Cl. .................................. 210/610; 210/150; 210/616; 210/621; 210/903; 210/908
[58] Field of Search ............................ 210/616–618, 210/150, 151, 610, 611, 903, 908, 909, 620, 621, 622

[56] References Cited

U.S. PATENT DOCUMENTS

| | | | |
|---|---|---|---|
| 4,069,148 | 1/1978 | Hutton | 210/616 |
| 4,581,338 | 4/1986 | Robertson | 435/176 |
| 4,820,415 | 4/1989 | Reischl | 210/616 |
| 4,983,299 | 1/1991 | Lupton et al. | 210/617 |
| 5,126,042 | 6/1992 | Malone | 210/616 |
| 5,185,415 | 2/1993 | Kawabata et al. | 210/616 |
| 5,217,616 | 6/1993 | Sanyal et al. | 210/150 |

OTHER PUBLICATIONS

The Biomediation Report vol. 1, No. 10 Oct. 1992, p. 2.

*Primary Examiner*—Thomas Wyse
*Attorney, Agent, or Firm*—George W. Moxon, III; Alfred D. Lobo

[57] ABSTRACT

The biochemical oxidation of two wastewater feeds, one containing at least ten times more ammonia nitrogen, and the other at least ten times more chlorinated hydrocarbons, than present in a conventional municipal wastewater stream were treated in an aerated packed bed bioreactor inoculated with microorganisms ("cells") especially cultured and acclimated to the task. Arbitrarily shaped pieces of numerous microporous synthetic resinous materials (familiarly referred to as "porous plastics") are discovered to provide not only an excellent packing for the bioreactor, but also a peculiar catalytic function not normally associated with a biosupport. Microporous polytetrafluoroethylene (PTFE foam) appears to be too inert to generate a high level of microbial activity for either feed which was tested, while microporous polyethylene appears to be exactly what the cells ordered. Such activity cannot reasonably be correlated to the overall size of the micropores alone, because a calcined dolomite having substantially the same range of average pore sizes, exhibits a removal rate, measured as mg/min/m$^2$ of surface, which is generally about ten times lower than the rate obtained with the plastic biosupport, all other process conditions being the same. The comparison was made by simultaneously feeding several columnar glass reactors, each having a packed bed of different porous plastic packing, and one with commercially available microporous Celite®. As one might expect, the removal rate per unit volume (liter) of packing appeared not to correlate with the removal rate per unit of surface area, since the distribution of cells over the surface, and the rate at which the substrate is fed to the cells are the determining factors for removal rate. Shape of the micropores in the packing appear to influence activity.

8 Claims, 1 Drawing Sheet

PROCESS FOR BIOCHEMICAL OXIDATION OF ULTRA-TOXIC WASTEWATER IN A PACKED BED BIOREACTOR

BACKGROUND OF THE INVENTION

This invention is directed to the problem of disposing of ultra-toxic industrial wastewater streams containing high levels of toxins. Such an ultra-toxic stream is obtained as "feed" for this process, after a plant-wastewater stream containing "grey" and "black" water has been preliminarily treated. After such treatment, as will be explained herebelow, the "feed" obtained contains toxins such as ammonia, phenols, chlorocarbons, aromatic and aliphatic hydrocarbons, and the like, which could not have been degraded by the preliminary treatment.

This process converts the toxins to products such as carbon dioxide and water by biochemical oxidation, instead of separating the toxins with some type of adsorbent or separation medium (together referred to as "media"). The investment and cost of using such media is high, and the cost of disposing of the media after it has sorbed (whether adsorbed, absorbed, or otherwise) the toxins, is typically just as high, if not higher. The object was to develop a more cost-effective solely biological process than any currently used, or deemed suitable for use, preferably an aerobic process which would generate only a minimal amount of sludge to be disposed of, most preferably none.

This invention uses an aerobic process which stems from the discovery that available, acclimated microorganisms or bacteria, can quickly ingest and degrade toxins provided the toxins are fed to them at a sufficiently low concentration. Microorganisms or bacteria used in this and other processes for a similar purpose, are mainly unicellular organisms having a nominal diameter less than 2 $\mu$m, and more typically, about 1 $\mu$m or even smaller. These organisms will be referred to hereinafter as "cells" for convenience and brevity.

From a study of the prior art, the most relevant of which will be referred to herebelow, it appeared that a very large number of cells, adsorbed on a very high surface area adsorbent is necessary to degrade relatively low levels of toxins. The references appear not to have realized that relatively few cells can effectively dispose of a toxin at the same rate (measured as toxin removal rate, mg/min) as a much larger number of cells, if a large proportion of the latter cells are not able to feed on the toxin because they are engulfed with too much of the toxin; and, in contrast, the toxin is delivered to the former at a "regulated" or "metered", ingestible and degradable rate.

Stated differently, specific cells can only degrade as much of the toxin for which they are specifically acclimated, and no more. A cell will degrade even a relatively concentrated toxin if the amount fed to it is minimal. A cell will degrade a relatively large amount of the toxin if present in a dilute solution. It serves no useful purpose to serve a cell more toxin than it can ingest, and the cell will ignore the too-large amount of toxin, or the excess, until the excess is sufficiently large to affect the cell's well-being adversely. Thus, the logical deduction is: the more cells the better.

As a result, prior art solutions have relied on providing a biosupport having as large a surface area as possible, based on the fact that, in a process operating at equilibrium, cells cover every available square unit of surface. Therefore, the more surface area, the more the cells. Thus, the prior art has provided a host of processes (some are referred to in greater detail herebelow) using various adsorbents, specific combinations of adsorbents, and an adsorbent entrapped in a macroporous open-cell foam. (It will be recognized that the adjective "open-cell" simply describes the fact that the cells in the foam are in open communication with each other, and has nothing to do with a "cell" which biologically ingests and degrades toxin.)

However, for reasons which are not fully understood, simply having a very large surface area is not sufficient to expose all the cells in such a manner that each is exposed to an optimum level of toxin which the cell regards as a nutrient. For example, even when a very large number of cells are lodged on, and within, a high surface area activated carbon which is encapsulated in a macroporous foam (see Lupton et al, below), the removal rate of even a relatively low concentration of toxin is not commensurate with the total number of cells (as a function of surface area) available for the task.

Accordingly, we reasoned that a large number of cells, when fed with a toxin in high concentration in a feed, were unable to "see" their proffered nutrient in a concentration low enough to be ingested and degraded with dispatch. Particularly since a large surface area can realistically be provided only by porous supports, we reasoned that a large number of cells within the pores of the support were not, for one reason or the other, being proffered the nutrient at a concentration and in an amount they preferred, therefore could not ingest the toxin. Further, those cells at or near the surface, which were being presented with the "just right" concentration, were also presented with a much larger amount than they could degrade, therefore the cells ignored the remainder. The solution to the problem appeared to require that a very large number of cells be present, and that they be presented their nutrient (toxin) not only in an attractive concentration, but also in a usable amount. Since there appeared to be no problem lodging a very large number of cells, this being a function of surface area, it appeared that the real problem would be to find a way to "meter" the toxin to the cells in no higher an amount, and in no higher a concentration than they can ingest and degrade.

It was disclosed in U.S. Pat. No. 4,581,338 to Robertson et al, that pore diameters of from 1–25 $\mu$m are needed to accommodate cells which are about 1 $\mu$m in diameter, and that either a porous gel, usually an alginate gel, or a porous high-silica pellet, or one of a mixture of silica and alumina, provided the requisite pore size. But they stated that the use of gels is not without problems (bottom of col 1), and that the average pore diameter in the silica pellet was too small relative to the 1–25 $\mu$m diameter "needed to accommodate microbial cells"; therefore, concluded that "the economic attractiveness of such a support in commercial processes is greatly reduced" (see col 2, lines 39–48).

Despite the proscription relating to the use of small-pore supports, we were able to find in this teaching, the basis of a solution to our problem. We found that microporous open-cell supports, having particular cell geometries which are specific to those supports, provide "windows" or "openings" which serve as orifices to meter just the right amount of nutrient to the cells lodged on the available total surface of the support, both the exterior surface as well as the interior surfaces 
of the support's cells, all and each of which is covered with a colony or colonies of cells (microorganisms).

Some microporous supports, whether a solid synthetic resin or a naturally occurring material, simply do not have the right chemical compatibility for most cells. In this specific respect, namely the chemical composition of the foam, note that Lupton et al (U.S. Pat. No. 4,983,299) state that the particular composition of the very large pore foam they used, was a relatively unimportant aspect of their invention, therefore they simply chose polyurethane for ease and convenience. We found that not only did the chemical composition of the foam make a difference, but also its physical structure particularly with respect to the geometry of the pores.

Further we found that, despite having more than adequate surface area, some microporous open-cell resins (whether foams or not) which are known to have extreme chemical inertness, such as polytetrafluoroethylene (PTFE) do not appear to have requisite chemical compatibility demanded by cells which feed on highly recalcitrant toxins. Other resins appear not to have a requisite microorganismcompatible geometry with that demanded by these cells, for the metering task. Some resins have neither the desired chemical microorganism-compatibility nor the requisite geometry, for example, PTFE. Quite unexpectedly, various microporous clays (e.g. calcined diatomite, commercially available as Celite® from Johns Manville Corp), and activated carbon, both of which have relatively high surface areas appear not to possess either the desired chemical compatibility or the requisite geometry.

We believed that the discovery of how to meter an ingestible amount of toxin to the cells with micropores of requisite geometry, could be effectively implemented in a biochemical oxidation process, though there is no reasonably practical method now available to determine the precise geometry which will satisfy particular cells. We have now determined that the essential feature of such a process is a fixed or immobilized packed bed of particular (chemical) types of microporous synthetic resinous packing having micropores with preferred "just right" geometries, in essentially all of which micropores especially acclimated colonies of cells are lodged without being held in suspension. When fed with enough nutrient (pollutant or toxin) to maintain the health of the securely ensconced colonies, these acclimated cells generate only so much growth as will lead to a net production of less than 10% (based on the chemical oxygen demand, "COD", of the toxin degraded) of the cell population. This is also noted in Lupton et al's fixed bed process, specifically to degrade phenols.

This process is not concerned with the bioremediation of domestic or municipal wastewater streams such as are typically treated in a municipal wastewater treatment plant, though the presence of a minor proportion of such domestic or municipal waste might either be adventitiously present, or may be deliberately included to provide additional nutrients for the especially acclimated cells used in this process.

More specifically, though it will be obvious that lower concentrations of even a highly recalcitrant toxin, less than about 40 ppm, can be removed from a feed with a conventional activated sludge process, or the known PACT process, the microporous packed bed of this invention is used to remove much higher concentrations of the highly recalcitrant toxin, in a process for the aerobic degradation of wastewater containing:

(a) from about 40–1000 mg/L (=40–1000 ppm) of ammonia by an inoculum (or culture) of Nitrosomonas and Nitrobacter;

(b) from 40–1000 mg/L of phenolic compounds, particularly phenol and resorcinol, (c) from 40–1000 mg/L of aliphatic and cycloaliphatic hydrocarbons, such as $C_4$–$C_{12}$ alkanes, e.g. butane, pentane; $C_5$–$C_8$ cycloalkanes, e.g. cyclohexane and cycloheptane; and $C_4$–$C_{12}$ alkenes, e.g. butene, hexene; $C_7$–$C_{28}$ cycloolefins, e.g. norbornene, dicyclopentadiene;

(d) from 40–1000 mg/L of aromatic hydrocarbons, such as benzene, toluene, naphthalene, anthracene, etc.;

(f) from 40–1000 mg/L of rubber chemicals such as mercaptothiazoles (MBT), MBT disulfide, MBT sulfenamide, etc.;

(g) from 40–1000 mg/L of aliphatic and aromatic amines, for example, diethylamine, cyclohexylamine, aniline and aralkyamines such as alkylated diphenylamine; and, (h) from 40–1000 mg/L of a halogenated organic compound, for example, a haloalkane such as 1,2-dichloroethane (EDC), perchloroethylene (PERC), a haloalkylene oxide such as epichlorohydrin, or a halogenated aromatic compound such as a chloro- bromo- or iodobenzene.

Except for the inoculum for the biodegradation of ammonia which is obtained from a laboratory culture, the inocula for the other wastewater streams are either obtained from wastewater contaminated with the compound(s) to be treated, or from soil around a pond of wastewater containing the compound(s) to be treated.

By the prefix "halo" we refer to compounds containing at least one chlorine, bromine or iodine atom which is covalently bonded in the compound's structure. Each inoculum used is obtained from the sources stated, those from soil contiguous to the contaminated wastewater being obtained because the wastewater itself is generally too toxic to support life of most known cells.

Each of the aforementioned organic compounds, even when present in a relatively low concentration, in the range >40 ppm but <100 μg/L, are known to be poisons for most common bacteria, particularly for those such as are generally used in a conventional municipal facility utilizing an activated sludge process. In the relatively low concentration range of from 40–100 mg/L, such organic compounds are essentially non-biodegradable by common bacteria.

Conventional domestic activated sludge such as is available from a typical municipal wastewater treatment plant is wholly unsuitable for use in our fixed packed bed process in which viable, aerobic cells are immobilized in the pores of a microporous synthetic solid resinous packing, familiarly referred to herein as "porous plastic". For this reason, an inoculum for use in our fixed packed bed is either especially cultured, or is isolated from a suitable source containing the toxins to be treated, and the inoculum is especially acclimated to ingest and biodegrade those toxins, such acclimation being accomplished by techniques which are well known in the art. The inoculum is thus specifically adapted to biodegrade the feed from which it is known to derive all or part of the nutritional requirements of the cells; therefore the inoculum is said to be adapted for a particular biodegradation duty.

As a result of the ultra-toxic nature of such industrial wastewater streams which are the "feed" to our process, unlike a municipal wastewater or sewage-containing stream, such ultra-toxic streams are generally treated with activated carbon, steam stripping and other comparably effective physical treatments. All these approaches, in principle, simply result in a physical exchange of the matrix which is contaminated, and hence are not environmentally friendly. In the PACT process the toxins are removed from the feed but remain on the adsorbent used. The adsorbent must then be disposed of. If the adsorbent is calcined, the toxins are released to the atmosphere.

Where a typical industrial wastewater stream, after primary treatment contains highly recalcitrant organics, or after secondary treatment, contains high ammonia-nitrogen concentration (greater than 40 ppm) the effluent is treated by additional means. Primary treatment comprises pH adjustment and solids settling; secondary treatment comprises biochemical oxidation using suspended cells (activated sludge treatment). A chlorocarbon stream containing >40 ppm of chlorocarbons cannot be biochemically treated conventionally. A typical feed containing >40 ppm ammonia-nitrogen will upon neutralization be ignored in the conventional secondary treatment because the ammonia-nitrogen containing salts are not toxic.

The typical industrial wastewater stream just referred to hereinabove, when fed to a conventional activated sludge treatment, has a relatively low BOD (biological oxygen demand), the ratio of BOD to COD being very low, typically less than 0.2 (<0.2). In contrast, a typical municipal wastewater stream has a BOD to COD ratio of greater than 0.6 (>0.6) because the stream contains mainly "grey" and "black" water. By "grey" water we refer to wash water from a sink, shower stall or bath, kitchen water including water from washing food-soiled dishes, laundry water and the like, all with detergents and/or soaps. By "black" water we refer mainly to water containing sewage from toilets, and effluent streams from meat packing plants and the like.

Since the cells are acclimated to degrade "feed" in the process we shall describe, the COD is essentially equal to the BOD, because what normally is non-biodegradable matter (and is therefore normally measured only as COD) is now consumed by the acclimated cells of the novel process as nutrients (carbon source). A typical chlorocarbon wastewater "feed" contains chlorocarbons in the range from 40–1000 mg/L, more typically from 65–600 mg/L. A typical ammonia-rich "feed" contains a number of nitrogenous compounds which are typically reported as "ammonia-nitrogen" which may range from 40–1000 mg/L, more typically 75–500 mg/L.

Ammonia is converted to nitrite by the Nitrosomonas cells, and the Nitrobacter cells convert the nitrite to nitrate. In addition to ammonia, the cells need to be supplied with a source of inorganic carbon and oxygen to effect nitrification. Such nitrification is accompanied with production of acid and the alkalinity of the influent wastewater is neutralized causing a drop in pH. A convenient means for supplying a combination of all three needs of the process is to maintain the pH of the bed by the addition of sodium carbonate or lime or caustic, or a combination thereof.

In such streams, aerobic bacteria, if adequately "protected" are able to withstand exposure to the ultratoxic compound(s), because the bacteria are nourished by the non-toxic easily biodegradable organic solids, while managing successfully to ignore the presence of the ultratoxic compounds. Because such wastewater streams are amenable to purification, albeit with primary, secondary and tertiary treatments, such wastewater streams are referred to herein as "relatively recalcitrant" wastewater streams. The process of this invention deals with even more recalcitrant wastewater streams, hence referred to as "highly recalcitrant" streams.

Such "protection" in the prior art, is provided by an adsorbent chosen to adsorb the toxin, as for example, in the well known PACT process in which either activated carbon, or a mixture thereof with Fuller's earth, is mixed into the wastewater, as will be described in greater detail herebelow.

It will immediately be evident that the higher the ratio of ultra-toxic toxin to non-toxic organic compounds in conventional wastewater, the less likely it is that cells will survive, and even less likely that they will replicate. When the BOD in such a wastewater stream is less than one-half the COD, even processes in which the stream is contacted with an adsorbent, fail to provide a bioreactor in which colonies of cells thrive at equilibrium conditions, and replicate regularly to maintain such conditions. The process of this invention is directed to either the secondary, and more typically, the tertiary treatment of highly recalcitrant streams in which the BOD is less than one-half the COD.

An example of a PACT process is the treatment, in a bioreactor, of a wastewater stream having a pH in the range from 4 to 11, and a total suspended solids (TSS) content of between 10 and 50,000 ppm (parts per million parts of feed) such as the process provided in U.S. Pat. No. 4,069,148 to Hutton et al.

This wastewater stream was specifically required to be mixed with a finely divided adsorbent having a surface area of at least 100 m$^2$ (square meters) per gram, the adsorbent being a mixture of from 5–50,000 ppm of activated carbon and from 25–2500 ppm adsorptive Fuller's earth, to form a suspension of the adsorbent in the wastewater. The suspension was then aerated and the adsorbent was then removed from the bioreactor.

As stated in the '148 patent "Not only does the presence of carbon or fuller's earth cause a segregation of poisonous impurities, but it also causes greater percentage of BOD removal, and it does so in a much shorter time." (see col 6, lines 10–13). Clearly, the poisonous impurities are not subjected to biochemical degradation but were simply adsorbed by the adsorbent mixed into the wastewater, rather than being ingested and degraded by the cells. Moreover, there is no indication in the '148 reference as to what the ratio of BOD to COD in a waste-water treatable by their process may have been; nor is the range of BOD to the 'total organic carbon' (TOC) specified. Most important, the only identification of the "poisonous impurities" treatable are heavy metal compounds, specifically lead, chromium and cobalt, which of course, are not biodegradable, but are highly susceptible to being adsorbed.

The problem with such adsorbent-based systems is that they require very long residence times in the bioreactor, result in the formation of mountains of sludge which must be disposed of, and if activated carbon is used, its cost dictates that it be separated and regenerated.

A process using a high surface area, macroporous biomass support of granular activated carbon, was used to degrade phenol with immobilized cells which are lodged within the support's macropores, and on the support's surface. With the cells so immobilized, they tolerated as much as 15 gm/L of phenol in the feed. (see H. M. Erhardt and H. J. Rehm, *Appl. Microbiol. Biotechnol.*, 21 32-6, 1985). They indicated that the carbon served as a "buffer and depot" to protect the cells, the carbon absorbing the phenol, so that the concentration of phenol in the water surrounding the bugs was low enough for them to biodegrade the phenol.

Macroporous supports used for packing in fixed beds are those supports having an open-cell pore structure, the pores being larger than 200 $\mu$m, and typically are much larger, so as to offer essentially no resistance to flow of feed not only around and over the packing, but through individual pieces or pellets of the packing. Microporous supports, on the other hand, have been used for packing in fixed beds for the sole purpose of providing an anchor for the cells, the flow of feed being over and around the packing. Especially heat treated clay pellets, such as of Celite® diatomite, have been used in the past, expressly for the purpose.

Lupton et al supra, discussed several embodiments of the "adsorbent" technology and presented yet another embodiment. They used a modification of packed bed technology in a "combination" process in which a packed bed of macroporous inert material (or "packing") is combined with an adsorbent, specifically, macroporous activated carbon, which is held within the much larger pores of an open-cell foamed polyurethane. This had the advantage of entrapping both, the activated carbon within the foam, and in turn, the phenol pollutant in the activated carbon. However, the activated carbon in this system is said to concentrate pollutants on its surface so that the proximity of the microorganisms to the locally high concentration of adsorbed pollutant would result in their faster and more complete degradation. (see col 5, lines 21-28). This was precisely what we sought not to do. We wished simply to meter the pollutant to the cells at the maximum rate at which they could ingest and degrade it.

Though the Lupton et al process purported to remove essentially all phenol within a hydraulic retention time (HRT) of less than 16 hr, and to lose no carbon from the reactor, thus avoiding the need to replace the carbon, their system was designed with different parameters from those used in our invention, and as a result are ineffective to cope with highly recalcitrant feeds.

SUMMARY OF THE INVENTION

It has been discovered that when a highly recalcitrant industrial wastewater feedstream ("feed") is "metered" to especially acclimated colonies of cells which are lodged in micropores >1 $\mu$m but no greater than 200 $\mu$m in average pore diameter, of a fixed packed bed biosupport of certain solid synthetic resins, and the cells are chosen because they thrive on a biodegradable toxic organic compound ("toxin") in the stream, such cells efficiently degrade and dispose of that toxin more effectively than the same cells, when lodged in a microporous calcined diatomite support having the same total surface area. This efficiency can best be measured as the removal rate of toxin per unit area, or (mg/min/m²), of biosupport.

It has more specifically been discovered that certain thermoplastic synthetic resins, having a microporous open-cell structure wherein the pores are in the size range from about 2 $\mu$m to 200 $\mu$m, provide ideal lodging for immobilized colonies of cells which are cultured for a particular biodegradation duty under aerobic conditions, provided the cells find their lodgings chemically compatible; further, that the cells which cover all available portions of the high surface area available within pores of the resin, provide a high density of cells per unit volume of bioreactor; still further, that micropores having a cell-compatible geometry provide the cells with precisely metered portions of nutrient from the overall amount of a highly recalcitrant "feed" fed to a fixed bed bioreactor, such portions being in an amount, and in a concentration, which is biodegradable by said cells.

It is therefore a general object of this invention to provide a fixed packed bed (referred to as a "porous plastic" because the only packing is microporous foam) bioreactor, the packing consisting of a microporous synthetic resinous biosupport, with pores smaller than 200 $\mu$m, free of any encapsulated adsorbent, to lodge a multiplicity of immobilized colonies of cells acclimated to a particular toxin or toxins borne by a feed in a relatively high concentration; and, to provide a simple and straightforward process for purifying a highly recalcitrant aqueous stream.

It is another general object of this invention to provide a process for aerobically degrading a feed containing a toxin, comprising, flowing the feed, containing from 40-1000 mg/L (same as 40-1000 ppm) of toxin, through a fixed packed bed of "lighter than water" pieces of a microporous synthetic resinous material having a pore size in the range from 2 $\mu$m to 200 $\mu$m, the pores having lodged therein only immobilized colonies of cells acclimated to the toxin in the feed, the fixed packed bed being maintained in the pH range from 6.0 to 8.5, there being essentially no measurable amount of suspended cells present particularly relative to the concentration of cells in a typical suspension process, and recovering a purified feed containing less than 10 ppm of the toxin without a net generation of more than 10% sludge (based on the chemical oxygen demand "COD" of the toxin degraded) in the bioreactor. In a typical suspension process the concentration of cells is typically >300 mg/L; in the present process the concentration of suspended cells is <25 ppm, typically ranging from 5 to 20 ppm.

It is a specific object of this invention to provide an efficient aerobic process for purifying the aforementioned feed, comprising, flowing the feed through a packed bed of pieces of a thermoplastic microporous biosupport which, being lighter than water, are held in place within the shell of a bioreactor (hence referred to as "held-in-place" bed) through which the feed is flowed upwardly, in the presence of a molecular oxygen-containing gas, at a flow rate corresponding to a hydraulic retention time (HRT) no more than 20 hr, preferably less than 10 hr, and obtaining a removal rate of toxin of at least 0.01 mg/min/m² of surface area of the packing. The pieces are of arbitrary shape and size, preferably being in the range from about 180 $\mu$m (80 mesh, Standard Wire Cloth Test Sieves) to about 50 mm (2 in), more preferably from 1 mm (18 mesh) to 22.4 mm (0.825 in), and have a pore size in the range from 5 $\mu$m to 100 $\mu$m.

It is another specific object of this invention to provide a process for purifying a wastewater stream containing as the major contaminant, a toxin selected from the group consisting of ammonia; phenols; amines; rubber chemicals; aromatic hydrocarbons, and halogenated, particularly chlorinated aromatic hydrocarbons; aliphatic hydrocarbons, and halogenated, particularly chlorinated aliphatic hydrocarbons. All such chlorinated compounds are together referred to herein as "chlorocarbons". Specific commonly present chlorocarbons include unsaturated aliphatic $C_2$–$C_6$ chlorocarbons such as vinyl chloride monomer, and saturated aliphatic $C_2$–$C_6$ chlorocarbons such as 1,2-dichloroethane. The process comprises, flowing the feed containing from 65 ppm to 600 ppm, more typically from >100 ppm but <500 ppm of at least one chlorocarbon through a packed bed of synthetic resinous packing at a flow rate corresponding to a HRT less than 10 hr, and removing the chlorocarbon at a rate of at least 0.01 mg/min/$m^2$ of packing surface area, wherein the packing is a thermoplastic microporous polymer selected from the group consisting of poly(vinylidene difluoride) PVDF, poly($C_2$–$C_3$ olefin) PO, particularly ultrahigh mol wt polyethylene PE(UH) and high density polypropylene PP, poly(ethylene-vinyl acetate) EVA, polytetrafluoroethylene PTFE, poly(styrene-acrylonitrile) SAN, polypropylene PP, divinylbenzene-crosslinked polystyrene PS(DVB), and Nylon 6, 11, 12 and 6/6, which packing has an average pore size in the range from 5 $\mu$m to 50 $\mu$m.

It is still another specific object of this invention to provide a unique fixed bed which develops distinguishing characteristics only after it is placed in operation in a bioreactor used to purify a highly recalcitrant feed containing a concentration of ultra-toxic compounds more than an order of magnitude (at least 10 times) greater than that likely to be present in a typical municipal stream, which peculiar circumstance requires that a helddown bed of pieces of open cell microporous synthetic resin be densely populated with cells particularly cultured for, and acclimated to, the biodegradation duty pressed upon them.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

The microporous packing is preferably in the form of small chunks, pieces, or particulate foam pellets (referred to hereinafter, individually and severally, as "pieces" for brevity) in a size and shape such as will allow them to be randomly packed in a bed having a void fraction in the range from about 0.35 to about 0.7, more preferably from about 0.4 to 0.6. Commonly available foam pellets are approximately cubes, or rectangular parallel-pipeds, either of which may have a central axial bore; and, may also be cylinders or hollow cylinders having an axial through-bore. Such porous plastic pieces are typically obtained by cutting up an extrudate having the desired cross-section.

Even when porous plastic pieces are freshly packed in a reaction vessel which is to serve as a bioreactor, that is, before the pieces are exposed to any medium containing cells, flow of clean water through the bed is not across and through the solid microporous cross-section of an individual piece. Instead, the flow is around the pieces, and if the pieces are tubular, then also through their axial bores, though the entire piece is wetted through-and-through, because the micropores are in open fluid flow communication one with another. Though water permeates the mass of every piece, relatively little water flows across the annular microporous wall of a cylindrical pellet, or through the porous mass of a cube, because the resistance of the micropores to the flow of water is too high relative to the low resistance around the pieces. Thus, toxin borne by the water is gradually fed to essentially all the cells lodged within the micropores, in an amount, and at a rate they can ingest and degrade.

In general, foam pieces are less dense than the feed to be purified, therefore a packed bed of foam pieces is immobilized in the reaction vessel by being held down with a wire screen secured to the inner walls of the vessel, or a mesh of interwoven rods having a diameter in the range from 4 mm to 6 mm, the mesh being press-fitted in the top of the vessel.

Purification of Wastewater containing Ammonia

Figure 1:
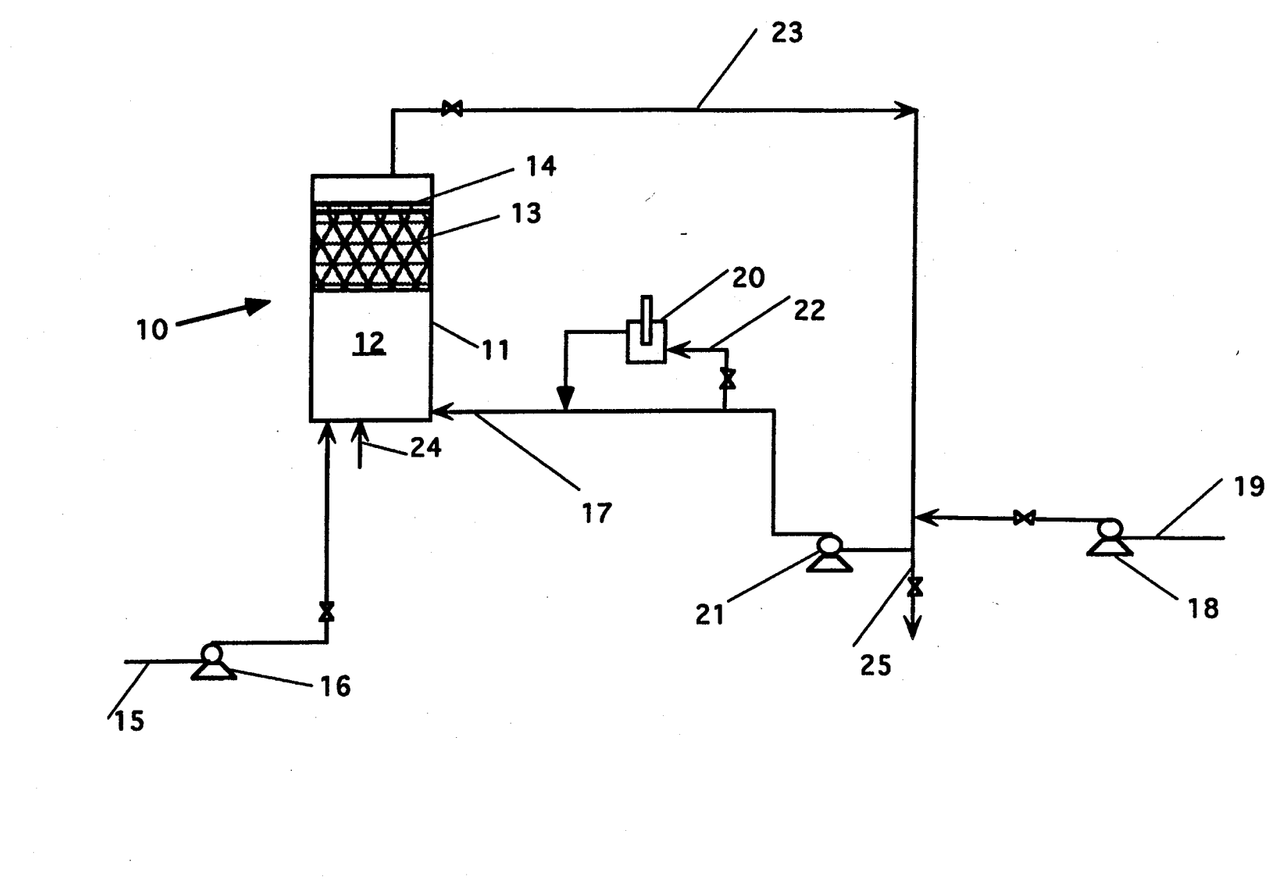
The FIGURE is a perspective view schematically illustrating a preferred configuration of a wastewater treatment system utilizing the process and the porous plastic packed bed of this invention for treating an aqueous ammonia stream.

Referring to FIG. 1, there is shown a porous plastic bioreactor referred to generally by reference numeral 10 which is a very large cylindrical vessel having a shell 11, about twice as high as it is wide, in which is formed a packed bed 12 of porous plastic pieces 13, most preferably with cubes of PE(UH) or Nylon, edge length about 10 mm, held down by a heavy wire screen 14, and inoculated with a culture of viable cells which upon replication, cover substantially all available area on the surface and within the pores.

An aqueous ammonia stream in feed line 15 is pumped from a secondary clarifier (not shown) to the reactor 10 by feed pump 16, preferably being distributed near the bottom of the packed bed by a spider (not shown). The ammonia content of the feed varies from 65–200 ppm, being mostly in the range >80 ppm and <165 ppm. Though ammonia-nitrogen ranged from 65–200 ppm in the tests conducted, other tests indicate that feed with ammonia-nitrogen as high as 1000 ppm can be metered to the acclimated cells in the packed bed of this process, without killing the cells.

Because Nitrosomonas and Nitrobacter cells are highly sensitive to the pH of their environment, and would be killed if the aqueous ammonia stream was acidified due to nitrification as the stream flows through the bed 12, it is essential that the pH of the water in the bed 12 be adjusted to a pH in the range from 7.0 to 8.5, more preferably from 7.8 to 8.3. The flow rate of feed is low in relation to the volume of the packed bed, so that the pH of the feed or its prompt neutralization is not sensed by cells in the bed because the rest of the water in the bed is maintained at the correct pH by a composition-adjustable recycle of treated water through line 17 having the correct pH. The flow rate of recycle is typically at least three (3) times that of the feed to the bed, and may be as high as 100-fold the feed rate, particularly when the feed rate is low, and the normal flow of recycle is maintained. At normal operating design conditions, the ratio of the flow of recycle to that of feed is in the range from 3 to about 5.

The desired composition is provided by the addition of the appropriate chemicals, including specific nutrients, to the feed, and the composition is adjusted as the requirements of the bed dictate. The correct pH is maintained by a pump 18 fed by a lime line 19 through which a concentrated lime or caustic solution is delivered. A flow cell 20 monitors the pH in the recycle line 17. A controller (not shown) senses the pH and activates the flow of lime or caustic solution when required to adjust the pH in the recycle line in the desired range.

Lime or caustic solution is used in those instances in which acid is generated in the bed, mainly when the feed contains halogens, particularly such as chlorine, bromine and iodine, or ammonia. In those instances where the acidification is due only to $CO_2$ generated from biochemical oxidation, for example, of aromatic and aliphatic hydrocarbons, the pH adjustment of the bed is self-maintaining and adjustment by addition of appropriate neutralizers is not normally required. Where a feed stream has a very low or high pH relative to that required in the bed, the pH should be adjusted using alkali or acid, respectively, as required to maintain the pH in the desired range.

Sufficient air, at least enough to provide the demands of the cells, and preferably a relatively large excess, is bubbled though the bottom of bed 12 by introducing air or oxygen-enriched air through air line 24 which terminates in an air sparger (not shown) which distributes air beneath the entire lower surface of the bed.

Before the bioreactor is placed in service, the bed is inoculated with Nitrosomonas and Nitrobacter. A very small portion of the feed, optionally fortified with particular nutrients known to encourage replication, is flowed through the bed, and an adequate recycle stream with the correct pH is maintained, so as to permit the cells to replicate reliably; and the flow of feed is gradually increased, maintaining an appropriate recycle stream at the correct pH, until the entire bed is filled with cells, and a steady removal rate (0.06 mg/min/m$^2$ in this particular case) of the toxin is obtained, when the bed is said to have reached equilibrium conditions. The bioreactor is then placed in service.

The temperature sensitivity of the cells requires that the temperature be maintained in the range from 20° C.–35° C. more preferably from 25°–31° C., depending upon which particular strain of acclimated cells is used for the specific service (toxin) demanded of them. The process typically operates at ambient pressure (110 kPa) in a closed tank, there usually being a slightly elevated pressure due to the presence of gases generated during the biochemical oxidation reaction. If desired, for process flow considerations, the tank may be maintained under pressure up to 2 atm (300 kPa), or under slight negative pressure down to 100 kPa. The preferred pressure range is from 110 kPa–150 kPa, beyond which any advantage from the viewpoint of process considerations is negated by the cost of the pressurizable reactor.

It will now be realized that the flow rate of effluent 23 to be withdrawn from near the top of the vessel 11, and the size of the vessel, will be determined not only by the flow rate of feed 15 but the extent to which the concentration of ammonia in the feed varies. The difference in flow between streams in lines 23 and 17 is purified water containing less than 5 ppm ammonia which is led offsite through line 25 for reuse. The HRT is less than 5 hr to obtain a treated stream having a 5 ppm ammonia content.

It will be evident that the larger the vessel 11 in relation to the mass flow of feed 15, the better, noting of course, that economics dictate that the size be determined by the expected maximum flow rate of feed and its maximum ammonia content at any flow rate, and the minimum required HRT. The rate of removal of ammonia is about 0.06 mg/min/m$^2$ for an ammonia-containing feed from the effluent of a polymer chemical manufacturing process.

Purification of Wastewater containing 1,2-dichloroethane

In a manner generally analogous to that described hereinabove, an aqueous EDC-containing stream from a vinyl chloride manufacturing plant is treated in a bioreactor after first being subject to only a primary treatment in which settlable solids are removed. The bioreactor is most preferably randomly packed with PE(UH) or Nylon cubes, about 11 mm per side, held down as before, and the pH in the recycle stream is maintained in the range from 6.0 to 8.0, preferably from 6.5 to 7.5, and most preferably from 6.8 to 7.2. The removal rate of EDC in the bioreactor is about 0.1 mg/min/m$^2$ of packing with the acclimated cells used in this particular instance.

Comparison of Porous Plastic and Porous Clay packings

The ability of the cells to degrade the feed at the concentration in which the feed was provided was well-documented. We reasoned that if we compared materials having essentially the same size range of pores, the ability of openings of their micropores to "meter" the "just right" dosage of nutrient to colonies of cells within the micropores would be essentially the same, regardless of the chemical characteristics of the biosupport. Commercially available Celite® diatomite was a calcined and heat treated clay which was widely used as a biosupport, and it had pores in substantially the same size range as those in preferred porous plastics. Therefore we compared the porous plastic reactor to the Celite-packed reactor.

To provide closely comparable flow characteristics for the overall bed, we used pellets of Celite which provided the same void fraction in the bed, and the same low resistance to flow as the bed of cubic porous plastic packing, and packed each bed to essentially the same height in two substantially identical cylindrical glass columns which served as bioreactors. Glass is used to enable one to observe plugging.

Two comparisons were made, each comparing operation with microporous Celite calcined diatomite and several porous plastic packings, each comparison with two feeds, one containing ammonia (first comparison), the other EDC (second comparison), and each bioreactor was fed with the same amount of the same feed, simultaneously.

In a manner analogous to that described in FIG. 1, several substantially identical glass columnar bioreactors, each containing different packings, all of which are to be compared, are simultaneously fed with the same feed through a feed manifold. Each column is jacketed with a water jacket, and each jacket is supplied with cooling water to keep each bioreactor at the same desired operating, preferably one in the range from 29° C.–31° C. Each column is provided with threaded Teflon® upper and lower end pieces, bored and tapped for fittings to make the various fluid-tight connections to establish the process flow. One reactor (the first) contains a packed bed of a first microporous plastic, another (second reactor) is packed to substantially the same height with a second microporous plastic, still another (third reactor) is packed with a third microporous plastic, and so on, and a Celite reactor is packed with Celite calcined diatomite. Each packed bed is supported on a perforated Teflon ® disc and held down by a stainless steel screen.

A last reactor inoculated with the same acclimated cells as the other reactors, but without any packing, is connected for operation as a suspension reactor. This was done to simulate a conventional activated sludge reactor operating with the acclimated cells for the purpose of comparing its performance based on biodegradation rate/unit volume.

More specifically, the Celite reactor is packed with cylindrical (8.74 mm×6 mm i.d.) pellets of Celite, and the first reactor is packed with cubes (11.3 mm on edge) of microporous ultrahigh density polyethylene, the second reactor is packed with microporous Teflon ®, the third is packed with PVDF, the fourth is packed with Nylon 6/6, the fifth is packed with sintered PVC, and the packed volume of each bed is the same, so that there is about 30 times more surface per liter of packed bed in the Celite bed, than there is in the beds of microporous plastics. The total surface area available is 456 $m^2/L$ of Celite bed, and that of the PP bed is 14.2 $m^2/L$.

A peristaltic pump is used to feed the secondary clarifier feed at the desired flow rate through a feed manifold with appropriate valving and feed lines to the bottom of each reactor, respectively, from a vented feed reservoir.

House air is filtered and sparged in the bottom of each column, the flow being monitored by a flow meter. Air and purified water flow out of the top of the bed through an effluent line which carries effluent purified water from each reactor. The same recycle ratio is maintained for each reactor, each reactor having its own recycle pump and pH adjusting system. The effluent water from each reactor is collected in separate vented receivers. A sampling sidestream on each reactor allows a sample to be removed during operation.

The reactors are operated in a "plug flow recycle" mode. "Plug flow recycle" refers to a flow condition in which turbulent flow is maintained by introducing the recycle stream into the bed, and the feed is delivered to the bed in such a manner as to flow progressively through the initial portion of the bed before the feed is thoroughly mixed into the liquid in the bed, and completely loses its identifying composition, becoming one with that of the liquid in the bed. This operation in a plug flow recycle mode allows control of the pH in the most preferred range. A metering pump is used to recycle the liquid contents collected from each column's operation.

Comparison of packings for degradation of Ammonia

For the first comparison, the bioreactors are equilibrated with Nitrosomonas and Nitrobacter obtained from laboratories of University of Akron. The ammonia stream contained varying amounts of ammonia in the range from 65–165 ppm, and the flow varied.

In the second comparison, the inoculum was obtained from soil contaminated with EDC. The cells were further acclimated to biodegrade up to 600 ppm of EDC in an aqueous EDC-containing stream. We thus made an analogous comparison in analogous beds, in substantially identical reactors, as described above.

First Comparison—Ammonia Removal with Various Packings

A comparison of the removal rate constants for ammonia per unit volume of packing (per liter), and per unit area of packing (per square meter), for the immobilized biomass in each packing tested, along with the rate for a suspended biomass, is presented in the following Table 1:

TABLE 1

| Type of packing | Removal Rate for Ammonia | |
|---|---|---|
| | mg/min/L | mg/min/$m^2$ |
| Celite$^R$ calcined diatomite | 0.641 | 0.0043 |
| Polyethylene (ultra high) | 0.790 | 0.059 |
| Teflon$^R$ PTFE | 0.803 | 0.0035 |
| PVDF | 0.921 | 0.032 |
| Nylon 6/6 | 0.560 | 0.072 |
| Sintered PVC | 0.466 | 0.011 |
| Suspended* | 0.060 | |

*These data were obtained in the suspension bioreactor with the same microorganisms used in the columnar packed bed reactors.

From the foregoing it will be evident that the removal rate of ammonia for Celite, on a unit volume basis, is (0.641) only slightly lower than that (0.790) for PE(UH). The rates (volume basis) for the other packings tested show that they are about the same, or slightly lower than the rate for Celite.

However, on a unit area basis, the removal rate for PE(UH) (0.059) and Nylon 6/6 (0.072) are more than one order of magnitude (10 times) greater than the rate (0.0043) for Celite. Sintered PVC provides one of the lowest rates, and this rate of 0.01 mg/min/$m^2$ is from a practical operational point of view, the minimum acceptable rate in this process. This criterion indicates no advantage in using a microporous PTFE packing over Celite, and that the greater inertness of PTFE and its peculiar chemical composition and/or the geometry of its micropores are not as compatible with these cells for this purpose, as are the remaining porous playtic packings tested.

The surface area for the different packings used hereinabove are given below in the following table 2:

TABLE 2

| Type of packing | $m^2$/gm of packing |
|---|---|
| Celite$^R$ calcined diatomite | 0.27 |
| Polyethylene (ultra high) | 0.024 |
| Teflon$^R$ PTFE | 0.173 |
| PVDF | 0.027 |
| Nylon 6/6 | 0.014 |
| Sintered PVC | 0.038 |

Second Comparison—EDC with Various Packings

A comparison of the removal rates of EDC per unit volume of packing, and per unit area of packing, for the immobilized biomass in each packing tested, is presented in the following Table 3:

TABLE 3

| Type of packing | Removal Rate for EDC | |
|---|---|---|
| | mg/min/L | mg/min/$m^2$ |
| Celite$^R$ calcined diatomite | 1.65 | 0.006 |
| Polyethylene (ultra high) | 1.46 | 0.11 |
| Nylon 6/6 | 0.791 | 0.094 |

For obvious economic reasons, and particularly in view of the long time required to make a single run, it is not possible to provide a multiplicity of experimental test runs, one for every microporous resin which might be found useful. It is expected that, in the event that one skilled in the art seeks to find a more efficient porous plastic packing for either of the specific processes tested hereinabove, or the biodegradation of yet another compound than those used herein, one can, with a little trial and error such as one is enured to undertake under analogous circumstances, find other specific microporous resins for the intended purpose.

Among such other microporous resins which are expected, with some trial and error, to be suitable for use as compatible microporous biosupports are those of poly(cycloolefins), particularly of addition copolymers of DCPD (dicyclopentadiene) and ethylene.

Numerous synthetic resinous microporous biosupports which are not commonly available in microporous form, include:

copolymers of styrene and/or α-methyl styrene and acrylonitrile, and copolymers of styrene/acrylonitrile (SAN); terpolymers of styrene, acrylonitrile and diene rubber (ABS); copolymers of styrene/acrylonitrile modified with acrylate elastomers (ASA); copolymers of styrene/acrylonitrile modified with ethylene/propylene/diene monomer (EPDM) rubber (ASE); polystyrene; chlorinated polyvinyl chloride (CPVC); polycarbonate (PC); thermoplastic polyesters (TPES), including polybutylene terephthalate (PBT), polyethylene terephthalate (PET), and aromatic polyester; polyether-ester segmented copolymers, such as Hytrel* by DuPont Corp.; polyurethane (PUR); miscible blends of polystyrene and polyphenylene oxide (PPO), commercially available as Norel from General Electric Company; polyacetals (POM); copolymer of styrene and maleic anhydride (SMA); polymers of acrylic acid, methacrylic acid, acrylic esters, and methacrylic esters; polyamide-imide; polyacrylonitrile; polyarylsulfone; polyester-carbonate; polyether-imide; polyether-ketone (PEK); polyether-ether-ketone (PEEK); polyalphaether ketone (PAEK); polyether sulfone; polyphenylene sulfide; and polysulfone.

Having thus provided a general discussion, described the overall process in detail and illustrated the invention with specific examples of the best mode of forming a packed porous plastic fixed bed, and carrying out the process, it will be evident that the invention has provided an effective solution to a topical and difficult problem. It is therefore to be understood that no undue restrictions are to be imposed by reason of the specific embodiments illustrated and discussed, and particularly that the invention is not restricted to a slavish adherence to the details set forth herein.

We claim:

1. A process for aerobically degrading an industrial wastewater feed containing a toxin for microorganisms typically present in municipal sludge, and substantially non-degradable therewith, said process comprising, (a) inoculating a fixed packed bed of pieces of a chemically compatible microporous synthetic resin biosupport having micropores of preselected geometry, with an inoculum of a culture acclimated to aerobically degrade said toxin, each of said pieces having a pore size in the range from 2 $\mu$m to 200 $\mu$m;

(b) flowing, in the presence of a molecular oxygen-containing gas, only enough of said feed essentially free of solids and containing in the range from about 40 mg/L to 1000 mg/L of said toxin, over and around said pieces of biosupport, through said fixed bed for said microorganisms in said inoculum to replicate, and, incrementally increasing flow of said feed until essentially all pores of said resin have lodged therein, only immobilized colonies of said microorganisms acclimated to said toxin there being essentially no measurable amount of suspended cells present; thereafter, (c) flowing said feed through said bed at a flow rate corresponding to a hydraulic retention time (HRT) no more than 20 hr;

(d) maintaining a pH within said bed in a range from 6.0 to 8.5 compatible with the activity of said microorganisms; and, (e) recovering a purified feed containing less than 10 ppm of said toxin.

2. The process of claim 1 wherein said bed has a void fraction in the range from 0.35 to 0.7; said pieces are of a thermoplastic resin, of arbitrary shape and size in the range from about 180 $\mu$m (80 mesh, Standard Wire Cloth Test Sieves) to about 50 mm (2 in), and less dense than water; said pores are in the size range from 5 $\mu$m to 200 $\mu$m; said HRT is less than 10 hr; and, obtaining a removal rate of toxin of at least 0.01 mg/min/m$^2$ of surface area of said biosupport.

3. The process of claim 2 wherein said pH is in the range from 6.0 to 8.5; said pieces are in the size range from 1 mm (18 mesh) to 22.4 mm (0.825 in), said pores are in the size range from 5 $\mu$m to 100 $\mu$m; said toxin is a major contaminant in said feed; said toxin is present in the range from about 65 mg/L to 600 mg/L and is selected from the group consisting of ammonia; phenols; amines; rubber chemicals; aromatic hydrocarbons; halogenated aromatic hydrocarbons; aliphatic hydrocarbons; halogenated aliphatic hydrocarbons; and, said HRT is less than 10 hr.

4. The process of claim 3 wherein said toxin is at least one of said saturated aliphatic $C_2$-$C_3$ chlorocarbons present in the range from >100 ppm to <500 ppm, said HRT is less than 6 hr, said pH is in the range from 6.5 to 7.5, and removing the toxin at a rate of at least 0.01 mg/min/m$^2$ of biosupport surface area, with essentially no measurable amount of suspended microorganisms present, and without a net generation of more than 10% sludge, measured as the COD of toxin degraded.

5. The process of claim 4 wherein maintaining said pH in said range comprises introducing a composition-adjustable recycle at a flow rate at least three times that of said feed to flow progressively through the initial portion of said bed and distributing said recycle therethrough to mix liquid in said bed.

6. The process of claim 5 wherein said toxin consists essentially of said saturated aliphatic $C_2$-$C_3$ chlorocarbons said microorganisms are cultured for survival and replication, said pH is maintained in the range from 6.8 to 7.2, and said biosupport is selected from the group consisting of poly(vinylidene difluoride) PVDF, poly($C_2$-$C_3$ olefin) PO, ultrahigh mol wt polyethylene PE(UH) and high density polypropylene PP, poly(ethylene-vinyl acetate) EVA, polytetrafluoroethylene PTFE, poly(styrene-acrylonitrile) SAN, polypropylene PP, divinylbenzene-crosslinked polystyrene PS(DVB), sintered poly(vinyl chloride) PVC, Nylon 6, 11 and 6/6.

7. The process of claim 3 wherein said toxin consists essentially of ammonia and nitrogenous compounds present in the range from >100 ppm to <500 ppm, said 
microorganisms are Nitrosomonas and Nitrobacter, said HRT is less than 6 hr, said pH is in the range from 7.8 to 8.3, and removing the toxin at a rate of at least 0.01 mg/min/m$^2$ of biosupport surface area, with essentially no measurable amount of suspended microorganisms present, and without a net generation of more than 10% sludge, measured as the COD of toxin degraded.

8. The process of claim 3 wherein said biosupport is selected from the group consisting of poly(vinylidene difluoride) PVDF, poly($C_2$–$C_3$ olefin) PO, ultrahigh mol wt polyethylene PE(UH) and high density polypropylene PP, poly(ethylene-vinyl acetate) EVA, polytetrafluoroethylene PTFE, poly(styrene-acrylonitrile) SAN, polypropylene PP, divinylbenzene-crosslinked polystyrene PS(DVB), sintered poly(vinyl chloride) PVC, Nylon 6, 11, 12 and 6/6.

* * * * *